United States Patent [19]

Kawai et al.

[11] Patent Number: 4,863,608
[45] Date of Patent: Sep. 5, 1989

[54] PHOTOCATALYTIC TREATMENT OF WATER FOR THE PREPARATION OF ULTRA PURE WATER

[75] Inventors: Tomoji Kawai, Minoo; Hisao Satoh, Sagamihara; Yoshiharu Ohta, Hiratsuka, all of Japan

[73] Assignee: Nomura Micro Science Co., Ltd., Tokyo, Japan

[21] Appl. No.: 166,050

[22] Filed: Mar. 9, 1988

Related U.S. Application Data

[63] Continuation-in-part of Ser. No. 016,581, Feb. 19, 1987, abandoned.

[30] Foreign Application Priority Data

Feb. 20, 1986 [JP] Japan .................. 61-33843

[51] Int. Cl.$^4$ .................. C02F 1/30; C02F 1/72
[52] U.S. Cl. .................. 210/638; 210/668; 210/748; 210/763; 210/900
[58] Field of Search .............. 210/758, 762, 763, 748, 210/900, 638, 641, 650, 652, 669, 668; 204/158.2; 502/178, 215, 220, 222, 223, 313, 315, 316, 326, 328, 332–336, 340, 350

[56] References Cited

U.S. PATENT DOCUMENTS

3,870,033  3/1975  Faylor et al. .................. 210/900
4,571,290  2/1986  Ward et al. .................. 204/157.69

Primary Examiner—Ivars Cintins
Attorney, Agent, or Firm—Larson and Taylor

[57] ABSTRACT

A new process step for purifying water from a small amount, particularly a last trace amount, of organic impurities included in total organic carbon (TOC) content is incorporated into known processes for the preparation of ultra pure water comprising one or more previous filtration steps and a series of purification steps known per se. The new step comprises irradiating the water to be treated with a light in the presence of a photocatalyst comprising an inorganic semiconductor selected from $TiO_2$, $SrTiO_3$ and $CdS$ in fine particulate form and a noble metal and/or an oxide thereof selected from Pt, Pd, Ru, $RuO_2$ and Rh deposited on said semiconductor particles for a period of time sufficient to oxidatively decompose the organic impurities, resulting in a decrease in TOC content of the water to a level lower than the minimum detection level of TOC detectors, typically <0.05 mg C/l or <0.01 mg C/l depending upon the sensitivity of particular detectors available up to date.

7 Claims, 1 Drawing Sheet

PHOTOCATALYTIC TREATMENT OF WATER FOR THE PREPARATION OF ULTRA PURE WATER

This application is a continuation-in-part of application Ser. No. 16,581 filed Feb. 19, 1987, now abandoned.

FIELD OF THE INVENTION

This invention relates to a new process step to be incorporated in a variety of water purification processes for the purpose of the preparation of so-called ultra pure or extrapure water, hereinafter referred to as ultra pure water. More particularly, this invention is directed to a step for purifying water, to be included in a series of water treatment steps for the preparation of ultra pure water, which relates to a catalytic photolysis of organic impurities contained in a small amount, particularly in a last trace amount, in water to be purified whereby removing substantially completely the total organic carbon, hereinafter referred to as "TOC", contents therefrom.

BACKGROUND OF THE INVENTION

Recently, demand for water of high purity in industrial applications has been markedly expanding in both the quantity and quality thereof. In particular, production of integrated circuits requires water of extraordinarily high purity, typically for rinsing semiconductor wafers. Such water of extra high purity is termed ultra pure water which consists only of water with little or no other substances or contaminants. Another important application of ultra pure water is found in the pharmaceutical industry as a charge for preparation and as wash water for final washing steps, for example.

Various processes have hitherto been proposed and practically used for the preparation of ultra pure water. Typical processes include reverse osmosis, adsorption on activated carbon, adsorption on ion exchange resin, ultrafiltration and "UV oxidation" so-called, which are adopted separately or usually in any appropriate combination thereof for a particular case and which are in any case combined with one or more previous treatment steps consisting essentially of one or more mechanical filtration steps, such as those by flocculation or coagulation, by solid contact sedimentation, by sand filter, by filter press and by other conventional filter means, to be appropriately selected dependent upon the nature of raw water to be treated, the nature of contaminants in the raw water and the amount of the contaminants and others. Thus, the preparation of ultra pure water has always relied on a multi-step process for purification of water.

One of most typical processes established and practiced in the prior art for the preparation of ultra pure water from a raw water such as city water, well water and industrial water comprises the steps of prefiltration of the raw water through one or more mechanical filtration means for the removal of solid particulate contaminants having particle sizes of about 5–10 μm and larger; reverse osmosis for the removal of at least 99% of solid particulate contaminants, at least about 90% of ionic contaminants and at most about 80% of organic contaminants included in TOC contents; sterilization with UV radiation for destroying microorganisms contained in the water; ion exchange treatment for the removal of ionic contaminants to a level being substantially complete; and ultrafiltration for the removal of residual trace contaminants to yield an ultra pure water desired. In such a multi-step process, it is of course customary in the art to make some change of the sequence of steps or replacement, addition or other modification of steps, depending upon the nature and quality of raw water to be treated and upon the quality of ultra pure water desired. For example, a "UV oxidation" step, if desired to be incorporated into the above-mentioned typical multi-step process, will usually and advantageously be inserted after the prefiltration step.

According to the processes already proposed for the preparation of ultra pure water, ionic impurities could be removed to a level lower than the minimum detection level of the measuring instrument used, but complete removal of TOC was difficult and still impossible. Thus, the TOC value of ultra pure water produced by the prior art processes was usually about 0.1 mg C/l at most, provided that the value was steadily achievable for a reasonable period of continuous operation. Even if the TOC value of lower than 0.1 $\mu$mg C /l were attained, it would be instable and would make the quality of ultra pure water fluctuable due to changes in the nature and concentration of organic impurities included in TOC content, thus posing a serious problem to be solved by further improvements.

As already mentioned, the quality requirement in TOC content for ultra pure water, particularly to be directed to the rinsing of semiconductor wafers called electronic grade water by ASTM is becoming severer year after year. Thus, in most recent years, according to proposed ASTM Standard for electronic grade water, Type E-I (the highest grade) and Type E-II (the next high grade) of such ultra pure water are required to satisfy the TOC of 50 ppb (0.05 mg C/l and 200 ppb (0.2 mg C/l, respectively. From this particular point of view, that is in respect of TOC content of ultra pure water required, typical prior art processes for the purification of water as above-referred to may be evaluated as summarized below.

Generally speaking, processes relying on either membrane-filtration or adsorption technique intend to remove simultaneously both the impurities included in TOC and those not included in TOC. Since, however, the higher the value of TOC in the water to be treated, the higher the load added to the apparatus to be used for the purification of water, there will occur, in the membrane-filtration processes, lowering of the output of purified water due to clogging of membrane and also lowering of the efficiency of the removal of impurities due to deterioration of membrane and, in the adsorption processes, saturated adsorption leading to leakage of impurities because of difficulty in control of amount of saturation adsorption.

In the membrane-filtration processes, the removal of organic impurities is usually effected by reverse osmosis where the organic impurities are removed together with ions and fine particulate materials after some previous treatments by mechanical filtration methods appropriately selected are taken, but the removal efficiency achievable thereby is within the range of 30–80% at the maximum depending upon the concentration of organic impurities in the water to be treated. On the other hand, the ultrafiltration processes are solely directed, as known, to the removal of organic impurities of high molecular weights, thus having been used mainly for the purpose of removal of fine particulate materials rather than the removal of TOC contents. As is well-known, organic impurities of low molecular weights contained in water can almost never be removed by ultrafiltration.

Adsorption processes such as those with ion exchange resins and those with activated carbon have such a low level of capability of TOC-removal as 50% at most depending upon the concentration of TOC in water to be treated. They also have such disadvantages that their applications are limited because it is impossible for ion exchange resin adsorption to remove any organic impurities with no electric charge and it is impossible for activated carbon adsorption to adsorb any organic impurities of low molecular weight, with a further possibility that ionic impurities are eluted, and that the control of adsorption saturation is difficult for all the processes in question.

"UV oxidation" so-called which has recently been developed mainly for the purpose of reclamation of waste wash water used for rinsing in various steps for the production of integrated circuits summarily comprises irradiating with UV light such waste wash water to be reclaimed to which hydrogen peroxide has been added, thereby causing oxidative decomposition of mainly TOC contents such as methanol, isopropyl alcohol, acetic acid, surfactants, photoresist, etc. However, UV oxidation is still not satisfactory in that a relatively long time is required, for example 2–4 hours when UV light is irradiated at an intensity of 2–10 KW/m$^3$ of the water to be treated, and the capability of decomposition by this method is limited to about 1/2–1/5 of the initial TOC content at the maximum. In this connection, it is to be added by way of reference that a simple UV irradiation which is a well-known step to be adopted during the preparation of ultra pure water is for the purpose of sterilization or destruction of microorganisms as, for example, disclosed in T. L. Faylor et al's U.S. Pat. No. 3,870,033. Thus, UV sterilization is conventionally effected by irradiation from a low-pressure mercury lamp, i.e. by UV light mainly of 2537Å. Clearly, under such conditions, there occurs no oxidation of organic impurities included in TOC content at all.

Under the state of the prior art as above-mentioned and in view of economy of resources and of prevention of environmental pollution, further development and improvement in the preparation of ultra pure water with higher efficiency and with higher quality is eagerly desired in order to solve the problems involved in the recovery and reclamation of water used more effectively and to cope with the increase in demand of ultra pure water of higher purity.

SUMMARY OF THE INVENTION

We have proceeded with our investigations on the preparation of ultra pure water, taking aim at lowering TOC content of water to be treated, that is at removing impurities participating in TOC content, and with the intention of making use of photocatalytic action of inorganic semiconductors in fine particulate form for this purpose. As a result, we have now found that light irradiation of water to be purified from organic impurities in the presence of a photocatalyst comprising a certain noble metal of Group VIII of the Periodic Table and/or an oxide thereof deposited on a certain inorganic semiconductor in fine particulate form leads to substantially complete oxidative decomposition of the organic impurities into carbon dioxide and water or at least other harmless or easily removable substances and therefore a new process can be derived therefrom for the production of ultra pure water which is significantly more efficient and capable of giving a much higher purity than those in the prior are processes by combining the above-said photocatalytic treatment, i.e. catalytic photolysis, step with any desired process known and established in the prior art for the purpose of producing ultra pure water.

It is therefore a primary object of this invention to provide a new, effective step to be incorporated in various processes of the prior art for the preparation of ultra pure water from a source of water selected from the group consisting of city water, well water, industrial water and washings removed from rinsing steps of semiconductor wafers in integrated circuit manufacturing processes, the source of water having a TOC content of the order of several mg C /l or less, with such unexpected result having been never achievable that the TOC content can be decreased to a level lower than the minimum detection level of TOC detectors, that is becomes substantailly null and not detectable.

This and other objects of this invention will become clear from the descriptions hereinafter given.

According to this invention, therefore, there is provided a process for the preparation of ultra pure water from a source of water selected from the group consisting of city water, well water, industrial water and washings removed from rinsing steps of semiconductor wafers in integrated circuit manufacturing processes, which comprises two basic stages (a) and (b), the former stage (a) being for previously treating the raw water in one or more mechanical filtration steps to remove solid particulate contaminants suspended therein and the latter stage (b) being for producing ultra pure water from the pretreated water by a series of purification treatments consisting essentially of steps known for the removal of residual solid particulate contaminants, of ionic contaminants, of organic contaminants included in total organic carbon (TOC) content and of microorganisms from the pretreated water to produce ultra pure water, said purification steps being selected from, and combined together, reverse osmosis, adsorption on ion exchange resins, adsorption on activated carbon, ultrafiltration, UV sterilization, microfiltration and other equivalent treatments, characterized in that a catalytic photolysis step is incorporated into the stage (b) for decreasing the TOC content of the water being treated to a level lower than the minimum detection level of TOC detectors, the said step comprising irradiating the water to be so treated with a light of a wave length corresponding to an energy higher than the band gap of an inorganic semiconductor used as specified below in the presence of a catalytic amount of a photocatalyst comprising an inorganic semiconductor in fine particulate form selected from $TiO_2$, $SrTiO_3$ and CdS and a noble metal and/or oxide thereof selected from Pt, Pd, Ru, $RuO_2$ and Rh deposited on said semiconductor particles for a period of time sufficient to oxidatively deompose the organic contaminants.

The photocatalytic action of inorganic semiconductors in fine particulate form is already known per se. Thus, if an inorganic semiconductor in fine particulate form is irradiated with a light having an energic power higher than the energy gap between the valence band and the conduction band of the said semiconductor, i.e. a light of a wave length corresponding to an energy higher than the band gap of said semiconductor, there occurs transfer of electrons from the valence band to the conduction band, thus forming positive holes in the valence band. The electrons and positive holes are diffused within and through each of said semiconductor particles and arrive at the surface thereof, thus capable of exhibiting their oxidative decomposition activity on the organic impurities in water when said semiconductor particles are present in said water. The deposition of certain noble metal as specified above and/or an oxide thereof onto the said semiconductor particles has been found to enhance further and greatly the catalytic activity of said semiconductor particles in question.

There have been various studies already made on the utilization of photocatalysts, among which those directed to the production of hydrogen from water are viewed with keen interest in the development of a new energy source. Some reports have also been presented on treatment of organic impurities contained in waste water to be purified with a view to preventing environmental pollution by relying on a strong oxidative action of photocatalysts. Thus, Japanese Patent Application Kokai No. 118289/85 published on June 25, 1985 (Application No. 224413/83 filed Nov. 30, 1983 by Giken Kogyo K.K., Japan) discloses a process for the purification of contaminated water, concretely for the purpose of treatment of sewage or waste water by irradiating the water to be treated with a light which is an ultraviolet light or an ultraviolet containing light in the presence of a photocatalyst whereby oxidatively decoding the contaminants wherein the photocatalyst is one which is obtained by depositing an organic titanate on the surface of a shaped article made of an inorganic material, followed by sintering the titanate-deposited shaped article to give titanium oxide on the surface of said shaped article and optionally by bringing further a platinum metal on the titanium oxide so deposited. As clearly stated in this Japanese Kokai specification, the process intended therein is solely or mainly to decompose and remove organic contaminants expressed as CODcr (Chemical Oxygen Demand determined by potassium dichromate). Those of ordinary skill in the art will know well that conversion of COD into TOC is impossible and vice versa and that the level of organic contaminants as expressed by COD is extremely higher than the level of those as expressed by TOC, the former being used conventionally to express the content of organic contaminants in sewage or waste water and the latter being used to express such very small, often last trace, amount of organic contaminants as contained in not sewage or waste water, but city water, well water, industrial water, washings from rinsing steps of semiconductor wafers with electronic grade water, pure water and ultra pure water. The selective oxidation of olefins with photochemical illumination of semiconductor powder suspensions is disclosed in Michael D. Ward et al's U.S. Pat. No. 4,571,290 which includes the use as photocatalyst of semiconductor powder optionally metallized by a noble metal element such as Pt and Pd. As clearly stated in this U.S. patent, the starting olefins are oxidized only partially by the method disclosed to give epoxides, alcohols, aldehydes and ketones. Therefore, the said patent merely teaches the partial oxidation of a large amount of olefins with a photocatalytically activated semiconductor powder suspension and does never teach or suggest such possibility that the method disclosed is applicable to the removal of last trace amount of organic contaminants included in TOC content from water for the purpose of the preparation of ultra pure water with unexpected effect that the TOC content of ultra pure water so prepared becomes substantially zero, i.e. a level lower than the minimum detection level of TOC detectors as intended and achieved by this invention. Actually, so far as we can know, no proposal has yet been made on the application of photocatalysts to the complete removal of trace amount of organic impurities contained in water to be treated for the purpose of producing ultra pure water. It was quite unexpected even for us that the application of such photocatalyst to the preparation of ultra pure water could result in substantial decrease in residual trace content of organic impurities in water to be treated to a level lower than the minimum detection level of the measuring instrument used. Although it is a matter of course that the minimum detection level of detectors may be improved more and more with the progress of technology, the said level of typical TOC detectors commercially available and conventionally used at least up to 1986 was not lower than 0.05 mg C/l, provided a high reliability or reproducibility could be secured. One of such detector is Dohrman TOC analyzer of DC-80 type (manufactured by XERTEX-Dohrman, California, U.S.A.) which we have been using in our investigations as supported in Examples 1 to 9 and 11 given later. More recently, namely in the middle of 1987, we have purchased a new detector, TOC analyzer of OIC Model 700 manufactured by O.I. Corporation (Texas, U.S.A.) and found that the new analyzer can detect reproducibly and reliably 0.01 mg C/l of TOC as the minimum detection level thereof as supported in Examples 10 and 12 hereinafter given.

BRIEF DESCRIPTION OF THE DRAWING

The single drawing attached is a graph including two curves for making comparison in effect on the removal of residual trace amount of impurities from water in terms of TOC content of the water treated, between the photocatalytic process according to this invention (curve A) and the UV oxidation process according to the recent prior art (curve B).

DETAILED DESCRIPTION OF THE INVENTION

This invention is widely applicable for the purpose of removing a small amount, particularly a last trace amount, of organic impurities included in TOC content of water to be purified for the purpose of preparation of ultra pure water from a source of water as specified above by various known multi-step processes. Thus, the source of water, i.e. the raw water, to be utilized for the preparation of ultra pure water may be selected from city water, well water, industrial water and washings removed from rinsing steps of semiconductor wafers in integrated circuit manufacturing processes. The catalytic photolysis step, the characteristic step, according to this invention may be incorporated at any point, as desired, in the course of the stage (b) as specified above, that is after the finish of the stage (a), the pretreatment stage, as hereinafter explained in detail.

The inorganic semiconductor in fine particulate form which may be used as the first component of the photocatalyst according to this invention is selected from $TiO_2$, $SrTiO_3$ and $CdS$, amond which $TiO_2$, particularly in anatase form, is most preferred, in view of the energy gap of valence band and conduction band and of the position in respect of standard hydrogen electrode potential. The particle diameter of the fine particulate inorganic semiconductor to be used according to this invention is generally about 30 mμ to 100 μ and preferably about 100 mμ to 10 μ.

The noble metals and/or an oxide thereof which may be used in this invention in deposited form on the fine particles of the inorganic semiconductor are Pt, Pd, Rh, Ru and $RuO_2$, separately or in combination. The amount of noble metal and/or oxide thereof deposited on the semiconductor particles may vary dependent upon the nature of said noble metal and/or oxide thereof used, the nature of said semiconductor material used, the purpose of the use of said photocatalyst and other factors, but is usually about 0.1 to 15% by weight based on the weight of the semiconductor used.

The amount of the photocatalyst may also vary depending upon various factors similar to those given with respect to the amount of noble metal and/or oxide thereof as above-mentioned, but is generally about 0.005 g to 5 g per liter of water to be treated and more usually about 0.1 to 1 g on the same basis.

It is to be understood that the choice of particular photocatalyst, i.e. particular combination of certain inorganic semiconductor in fine particulate form with certain noble metal and/or oxide thereof, composition and amount thereof to be used for particular application of this invention may be easily made by those of ordinary skill in the art, depending upon particular water to be treated and the quality required for the ultra pure water intended, on the basis of the teachings of this invention, if necessary by simple experiment.

Most typical examples, among others, of the photocatalysts usable for the purpose of this invention include $TiO_2/Pt$, $TiO_2/Pt+RuO_2$, $TiO_2/Pd$, $TiO_2/Rh$, $SrTiO_3/Pt$ and $CdS/Pt$.

The deposition of noble metal and/or oxide thereof as the second component of the photocatalyst on the inorganic semiconductor component may be effected by any known method properly chosen according to the nature of the semiconductor, such as kneading and photoelectrodeposition (i.e. photoplating), the latter being preferred because high bonding can be given between the active metal or its oxide and the said semiconductor component.

The characteristic step, i.e. the catalytic photolysis step, according to this invention can be carried out at any appropriate point in the course of the stage (b) specified above which is involved in various known processes for the preparation of ultra pure water. The point at which the catalytic photolysis step is carried out mainly depends on the nature of raw water to be treated for said purpose and thus on the nature and amount of impurities contained therein. Thus, in cases where the raw water to be treated is city water, industrial water or well water, it is usually preferred to apply the catalytic photolysis step of this invention to a partially purified water by reverse osmosis and/or by ion exchange depending upon the quality of said water, for example. In cases where the raw water to be treated is washings withdrawn from rinsing steps of the processes for the production of integrated circuits, the catalytic photolysis step of this invention may typically be applied after steps of activated carbon- and/or primary ion exchange-treatments.

According to one of the most typical embodiments of this invention, the overall process for the preparation of ultra pure water from a raw water as specified above may comprise the steps of prefiltration of the raw water through a filter press or other known mechanical filtration means, alone or in combination, for the removal of solid particulate contaminants having particle sizes of about 5–10 μm and larger; reverse osmosis for the removal of at least 99% of solid particulate contaminants and of at least about 90% of ionic contaminants and at most 80% of organic contaminants included in TOC contents; a primary ion exchange treatment for the removal of residual ionic contaminants substantially completely; photocatalytic treatment which is the new, characteristic step of this invention for the removal of residual trace amount of organic contaminants by oxidative decomposition thereof and for destroying microorganism contaminants; final ion exchange treatment for the removal of ionic contaminants to a level being substantially complete which is often called "polishing"; and ultrafiltration and/or microfiltration for the removal of residual trace contaminants to yield an ultra pure water desired. In a more specific embodiment which is preferred for the purification of city water according to this invention, the raw water is first treated through sand filter and the like for flocculation of solid particulate contaminants and then filtered by conventional filter means (i.e. the stage (a) for mechanical filtration treatments), after which the pretreated water is brought in the stage (b) where it is successively subjected to reverse osmosis for removing at least about 90% of ionic contaminants and at most 80% of organic contaminants included in TOC content, degasification for removing about 80–90% of carbon dioxide and other gases, a primary ion exchange treatment for removing the residual ionic contaminants substantially whereby to lower the resistivity of the water to a level of about 1–10 MΩ·cm, UV sterilization for destroying microorganisms contained therein, final ion exchange treatment, i.e. polishing, for removing last residual ionic contaminants substantially completely and then microfiltration and/or ultrafiltration for removing last residual fine particulate contaminants substantially completely, the catalytic photolysis which is the characteristic step of this invention being desirably carried out at a point from after the reverse osmosis to before the polishing treatment. Thus, in cases where the TOC value of the water from the reverse osmosis step is relatively high, namely about 0.3 mgC/l or higher, the catalytic photolysis is desirably applied to the water leaving the reverse osmosis step to prevent the ion exchange resins used in the subsequent step(s) from contamination with the organic contents. On the other hand, if the TOC value of the water from the reverse osmosis step is relatively low, namely lower than 0.3 mg C/l, the catalytic photolysis is preferably applied to the water from after the primary ion exchange treatment to before the polishing step.

Further, taking into consideration such a measure elaborated and desirably adopted in the prior art that a part of ultra pure water obtained through ultrafiltration which is usually a final purification step is recycled to the upstream of water which is to be subjected to UV sterilization step in order to stabilize the quality of ultra pure water so obtained, it is usually desirable in practicing the process of this invention that the characteristic catalytic photolysis step is applied to the water leaving the primary ion exchange treatment step if the TOC content of the water at that point is about 0.2 mg C/l or higher, and if the TOC content of the same is lower than about 0.2 mg C/l, the step is applied to the water just before the polishing, final ion exchange treatment, step.

In practicing the process of this invention, the photocatalyst to be used in particular applications may be chosen depending mainly upon the nature and amount of organic contaminants to be decomposed and removed. Thus, $TiO_2$ as the semiconductor component exhibits a very strong oxidative action as being capable of effecting oxidative decomposition of most of organic contaminants though it has not a so wide wavelength range of light available. The combination of Pt with $TiO_2$ has been found to enhance much more the catalytic activity. The combination of CdS/Pt has a much wider wavelength range of light available than that of $TiO_2$/Pt and is therefore advantageous in energic point of view.

Generally, in order to effect the intended oxidative decomposition of organic impurities contained in water by photocatalytic reaction according to this invention, a suitable photocatalyst is first selected for each particular case, on which is then chosen an appropriate wavelength range of light to be used. Particle size of the inorganic semiconductor may suitably mainly in view of easy handling, to be a level of 30 m$\mu$ to 100$\mu$, particularly a level of 100 m$\mu$ to 10 $\mu$. The noble metals and/or oxides thereof to be deposited on the inorganic semiconductor particles should be chosen primarily dependent upon the activity level and the bonding strength thereof with the semiconductor. Amount of said noble metals and/or oxides thereof to be deposited on the semiconductor may also depend upon the nature thereof, the nature of semiconductor on which they are deposited, the method for deposition, activity level of the catalyst required and other factors in each particular case. In any event, the determination of the composition of particular photocatalyst to be suitably used may easily be made by those skilled in the art, if necessary, by routine experimental work. Typically, for the use of $TiO_2$ as semiconductor, the level of 1.0 to 10% by weight of said metal and/or oxide thereof will be suitably deposited thereon.

Now, the effect brought about by applying the process of this invention is illustrated in comparison with the so-called "UV oxidation" process as the most typical related prior art on the treatment of washings discharged in various processes for the production of integrated circuits. Organic contaminants in such washings are mainly composed of methanol, isopropyl alcohol and acetic acid. According to the UV oxidation process, such organic impurities can be removed by oxidative decomposition, in most cases, only in the level of about 1/5 to 1/2 of the initial content thereof at the maximum. In contrast therewith and quite unexpectedly, the process according to this invention can lead to substantailly complete removal by oxidative decomposition of such organic impurities; that is the TOC content of the water thus treated can be lowered to such level as being incapable of being determined by TOC detector commercially available and conventionally used, i.e. to a level lower than the minimum detection level of the detector, for example <0.05 mg C/l or <0.01 mg C/l as supported by Examples given later. Comparison of said oxidative decomposition capability between this invention where $TiO_2$/Pt is used as photocatalyst and the UV oxidation process has shown that at the same level of photo-energy applied to cause the oxidative decomposition reaction intended, the former process results in TOC content undetected in the water thus treated, i.e. lower than the minimum detection level of the detector used (typically <0.05 mg C/l or <0.01 mg C/l), at which time the latter process only attains the decrease in TOC content to a half of the initial content. The following is one concrete test we made for such comparison.

Figure 1:
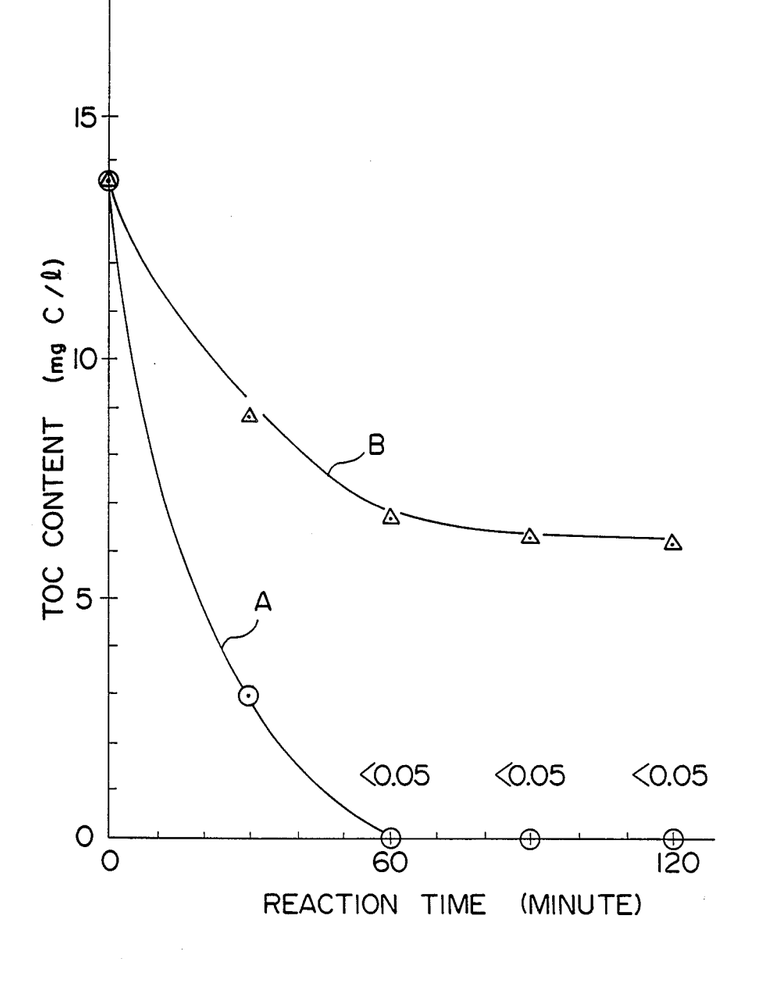

Water to be treated for this purpose was made up to have TOC content of 13.77 mg C/l by dissolving 10 mg/l each of methanol, isopropanol and acetic acid in an ultra pure water (TOC content: 0.07 mg C/l) already prepared. The water was treated in two different ways, i.e. by the photocatalytic process according to this invention and by the UV oxidation process of the recent prior art. In the photocatalytic process, $TiO_2$/Pt (0.5 g) was used as photocatalyst which was prepared by depositing 1% by weight of Pt by photoelectrodeposition on $TiO_2$ in anatase structure having a particle size range of 0.1 to 10 $\mu$(a commercial product), whereas in the UV oxidation process hydrogen peroxide was added to the water to be treated in an amount of 1.2 times as much as the initial total oxygen demand (TOD) of the water. In both the processes, then UV irradiation was effected by using a 500 W high pressure mercury lamp for 2 hours, during which TOC content of the water being treated was periodically determined every 30 minutes by TOC analyzer, Dohrman DC-80 type, the results of which are shown as curves A and B for the present process and the UV oxidation process, respectively, in the drawing attached.

The results of these comparative tests are believed to reveal such remarkable superiority in effect of the photocatalytic process of this invention to the known UV oxidation process as explained above. Thus, it is to be noted that the effect or capability of the TOC removal by oxidative decomposition of organic contaminant materials included in the TOC content of impure water, which is brought about by the use of the specific photocatalysts in the process of this invention, is quite unexpected and surprising from the level of the related art. More concretely, the water obtainable from a series of water-purification steps including the photocatalytic process of this invention as an essential step for removing organic impurities included in TOC content of the water by the photocatalytic oxidative decompostion can be used as ultra pure water as it is, whereas the water obtainable from a series of water-purification steps as similar as above except that the photocatalytic process of this invention is omitted and instead the UV oxidation step in question is adopted for the removal of organic impurities included in the TOC content of the water cannot be used as it is as ultra pure water because the water recovered from the latter overall process still shows TOC content as high as, or in some cases rather higher than, those of city water and industrial water. A further advantage of the utilization of the photocatalytic process of this invention in place of the UV oxidation process is in that no additional step is required for the photocatalytic process as in the latter process which is to be followed by a further step to treat any residual oxidizing agent unreacted such as hydrogen peroxide added to the water to be treated in said preceding step. Thus, for example, the photocatalytic process of this invention is advantageously applicable to the recovery of washings discharged from various steps for the preparation of integrated circuits whereby organic contaminants included in the TOC content in the washings can be removed nearly completely.

The characteristic photocatalytic process according to the treatment of other types of impure water, namely city water, industrial water and well water which are to be used as raw water for the preparation of ultra pure water which is particularly directed for use as rinse water for various steps for the production of integrated circuits and as a charge for the preparation of medicines and as wash water for final washing steps thereof. According to this invention, it is also possible to secure satisfactory removal by decomposition of trace amounts of organic impurities contained in water which are injurious to human health, particularly required for ultra pure water used for medicinal purposes.

A further advantage of the characteristic photocatalytic process of this invention over the level of the prior art is that in most of water-purification processes currently used for the purpose of producing ultra pure water, there is a tendency to bring on the apparatus used an undesirable load attributable to organic impurities contained in water to be treated and whereby to result in a breakdown or other fault of the apparatus, to which in contrast the process of this invention has no such tendency of loading at all.

The following Examples further illustrate, but in no way limit, this invention.

EXAMPLE 1

A standard sample of water to be treated was prepared by dissolving a proportion of 10 mg/l each of methanol, isopropanol and acetic acid in an ultra pure water (TOC content: 0.07 mg C/l) already prepared to give the TOC content of 13.77 mg C/l of the water sample with the intention of simulating the TOC content and the composition of main impurities included in TOC of typical washings discharged from various rinsing steps for the production of integrated circuits.

The photocatalyst used was of anatase $TiO_2/Pt$ type which was prepared by depositing 1% by weight based on the weight of $TiO_2$, of Pt on fine particles of $TiO_2$ of anatase type (a commercial product; particle size: 0.1–10 $\mu$) by photoelectrodeposition.

A 200 ml portion of the water sample prepared as above was taken in a 500 ml egg plant type flask and 0.5 g of the photocatalyst ($TiO_2/Pt$) prepared as above was added thereto. The contents were irradiated with UV light emitted from a 500 W high pressure mercury lamp for 2 hours under stirring. After the photocatalytic treatment, the TOC content of the water thus treated was determined by TOC analyzer, Dohrman DC-80 type, and found to be <0.05 mg C/l, that is below the limit of determination minimum of this analyzer.

COMPARATIVE EXAMPLE 1

By way of comparison, the procedure of Example 1 was repeated except that 0.5 g $TiO_2$ of anatage type as such, without Pt deposited, was used as the photocatalyst. The TOC content of the water thus treated was 0.6 mg C/l.

COMPARATIVE EXAMPLE 2

This Example is for the purpose of comparison showing the result of UV oxidation process. The procedure of Example 1 was repeated except that no photocatalyst was used and instead hydrogen peroxide was added to the water to be treated in an amount of 1.2 times of the TOD of the water. The TOC content of the water thus treated was 6.3 mg C/l.

EXAMPLE 2

The procedure of Example 1 was repeated except that the photocatalyst used was $TiO_2/Pt$ (amount of Pt deposited: 10% by weight based on the weight of $TiO_2$) which was prepared by kneading. The result thus obtained was the same as that in Example 1.

This Example was made for the purpose of studying the influence of the difference in method of preparing the photocatalyst on the catalytic activity. Thus, the comparison between Example 1 and 2 clearly showed that the use of photoelectrodeposition (Example 1) gave markedly superior bonding strength of Pt on $TiO_2$ in the resulting catalyst to that of the catalyst prepared by kneading (Example 2) and therefore that the former could considerably lower the amount of Pt required in compared with the latter to attain the same, desired level of catalytic activity.

EXAMPLES 3–5

The procedure of Example 2 was repeated except that Pt was replaced by other noble metal and/or oxide thereof as shown in Table 1 below. In each Example, the TOC content of the water thus treated was determined as in Example 1 and is shown also in Table 1.

TABLE 1

| Example No. | Photocatalyst Inorganic semi-conductor (g) | Photocatalyst Metal deposited (% by weight) | TOC content of the water recovered (mg C/l) |
|---|---|---|---|
| 3 | $TiO_2$ (0.5) | Pd (10) | <0.05 |
| 4 | $TiO_2$ (0.5) | Rh (10) | <0.05 |
| 5 | $TiO_2$ (0.5) | $RuO_2$ + Pt (5 + 5) | <0.05 |

It is to be understood that the photocatalysts used in Examples 3 to 5 above were prepared by kneading because this method was very simple and easy to be practiced.

EXAMPLE 6

The procedure of Example 2 was repeated except that $SrTiO_3/Pt$ (amount of Pt deposited: 10% by weight based on the weight of $SrTiO_3$) was used as photocatalyst in place of $TiO_2/Pt$. The TOC content of the water thus treated was determined as in Example 1 to be <0.05 mg C/l.

EXAMPLE 7

The procedure of Example 2 was repeated except that the light source used was a 500 W xenon (Xe) lamp with the result same as that in Example 2, that is giving TOC content of the water thus treated of <0.05 mg C/l.

EXAMPLE 8

The procedure of Example 7 was repeated except that 0.5 g of CdS on which 10% by weight of Pt has been deposited was used as photocatalyst. The TOC content of water thus treated was determined to be <0.05 mg C/l.

EXAMPLE 9

The procedure of Example 1 was repeated except that the water used for the treatment was actual washings (the TOC content: 25 mg C/l) derived from an industrial process for the preparation of integrated circuits. The TOC content of the water thus purified was <0.05 mg C/l. This Example appeared to be of value at least equal to that found in Example 1.

EXAMPLE 10

Three series of experiments were carried out, details of which are shown below, in order to confirm as to how the effect of the catalytic photolysis step of this invention is related with the nature of raw water and with the history of purification of the water, i.e. the concrete step or steps adopted for purification during the stage (b) prior to the catalytic photolysis step.

The first series of experiments were applied to city water, the second series to washings from rinsing steps of semiconductor wafers and the third series to a pure water so-called. The three kinds of raw water to be treated in these experiments were first measured their TOC content by TOC analyzer of OIC Model 700, a new model of TOC detector of high sensitivity, manufactured by O.I. Corporation, Texas, U.S.A. as well as all the subsequent measurements in this Example.

Each of the raw water samples was pretreated in stage (a) and then subjected to one or more purification steps in stage (b) and each of the water samples subjected to the respective treatments as stated in stages (a) and (b) was measured its TOC content as shown in the following Table 2.

The characteristic catalytic photolysis step as described in Example 1 was applied to the water so treated in stage (b) as stated in Table 2 for each run. Finally, the TOC content of the water thus obtained in each run was measured in the same manner as above and is also shown in Table 2.

In Table 2, the following abbreviations are used for designating the purification steps adopted.

C.F. : coagulation filtration
F.F. : filtration through filter
R.O. : reverse osmosis
I.E. : ion exchange treatment
D.G. : degasification
U.V. : ultraviolet sterilization
U.V.O. : ultraviolet oxidation
A.C. : activated carbon adsorption
U.F. : ultrafiltration
M.F. : microfiltration
C.P. : catalytic photolysis (characteristic of this invention)

TABLE 2

| Raw water after stage (a) (TOC mg C/l) | Run No. | Stage (b)*** Step 1 (TOC mg C/l) | Step 2 (TOC mg C/l) | Step 3 (TOC mg C/l) | Step 4 (TOC mg C/l) | Step 5 (TOC mg C/l) | C.P. (TOC mg C/l) |
|---|---|---|---|---|---|---|---|
| City water pretreated through C.F. and F.F. (2.12) | 1 | R.O. (0.84) | | | | | <0.01 |
| | 2 | R.O. (0.84) | I.E. (0.51) | | | | <0.01 |
| | 3 | R.O. (0.84) | D.G. (0.84) | I.E. (0.51) | | | <0.01 |
| | 4 | R.O. (0.84) | I.E. (0.51) | D.G. (0.51) | I.E. (0.29) | | <0.01 |
| | 5 | I.E. (1.15) | | | | | <0.01 |
| | 6 | I.E. (1.15) | R.O. (0.50) | D.G. (0.50) | I.E. (0.34) | | <0.01 |
| | 7 | D.G. (2.12) | I.E. (1.15) | | | | <0.01 |
| | 8 | D.G. (2.12) | I.E. (1.15) | R.O. (0.50) | U.V. (0.50) | | <0.01 |
| | 9 | D.G. (2.12) | I.E. (1.15) | U.F. (1.15) | U.V. (1.15) | | <0.01 |
| Washings from rinsing steps for semiconductor wafers (12.1)* | 10 | I.E. (10.5) | U.V.O. (4.5) | A.C. (3.1) | I.E. (0.89) | R.O. (0.46) | <0.01 |
| | 11 | I.E. (10.5) | U.V.O. (4.5) | A.C. (3.1) | I.E. (0.89) | U.F. (0.89) | <0.01 |
| Pure water (0.50)** | 12 | I.E. (0.11) | U.V. (0.11) | R.O. (0.07) | | | <0.01 |
| | 13 | I.E. (0.11) | U.V. (0.11) | U.F. (0.11) | | | <0.01 |
| | 14 | U.V. (0.50) | I.E. (0.11) | M.F. (0.11) | R.O. (0.07) | | <0.01 |
| | 15 | U.V. (0.50) | I.E. (0.11) | M.F. (0.11) | U.F. (0.11) | | <0.01 |

*The TOC content is the value measured after the washings were pretreated in stage (a) by A.C. and F.F.
**This raw water is so-called "pure water" commercially available which has the TOC value of 0.50 mg C/l without applying stage (a).
***All the numerals for TOC parenthesized in the columns of stage (b) are the TOC values measured after applying the step stated above the value concerned. Also, the oblique line drawn in column of stage (b) means that no treatment was done in that step and the characteristic catalytic photolysis step directly followed the preceding step designated.

The results of experiments given in Table 2 above clearly demonstrate that C.P. (catalytic photolysis) as characteristic step of this invention exhibited the effect quite unexpected and hitherto not attainable at all by any possible combination of known steps, for the purpose of removing a very small amount, i.e. a last trace amount, of organic impurities included in TOC content to a level of substantially zero, that is lower than the minimum detection level of a TOC analyzer of high sensitivity, <0.1 mg C/l, whereas R.O., I.E., U.V.O. and A.C., alone or in combination, were merely effective partially or a little for the purpose in question. Furthermore, the results showed that C.P. step can achieve the said effect by applying it only once in usual when it is incorporated at any point in the course of the stage (b).

EXAMPLE 11

This Example illustrates a further effect of the characteristic photocatalytic step of the process according to this invention, that is an effect on destruction of microorganisms existing in water.

A sample of water was prepared by providing a saline-lactose-broth medium consisting of a commercially available lactose-broth medium (0.4 g), sodium chloride (7.6 g), an ultra pure water having TOC content of 0.07 mg C/l (1,000 ml) and an amount of sodium hydroxide sufficient to adjust the pH of the resulting medium to 6.9±0.1, inoculating the said medium with a living microorganism, *Pseudomonas diminuta* (a commercially available microorganism), and incubating the medium thus inoculated at 30° C. for 24 hours whereby giving the concentration of about $10^6$ cells per milliliter of said microorganism and the TOC content of about 1,000 mg C/l in the water sample. Such a high TOC content was due to the presence of medium incubated.

The water sample was subjected to the photocatalytic treatment quite the same as that given in Example 1.

After the treatment, a portion of water thus treated was filtered and the filtrate was dyed with a microorganism-staining dye in a usual manner and a specimen prepared therefrom was observed on a light microscope by direct method with the result that no intact cells of microorganisms were found at all. Also found in determination of TOC content carried out in the same manner as in Example 1 was that the water thus treated unexpectedly showed a very low value of TOC content, about 0.1 mg C/l, in spite of the very high TOC content in the raw water. A further time of the photocatalytic treatment will be able to lower the TOC to <0.05 mg C/l as similar as in Example 1.

EXAMPLE 12

This Example further illustrates the unexpected effect of the characteristic photocatalytic treatment of this invention in comparison with the conventional UV sterilization treatment.

A sample of water was prepared by dissolving a proportion of 10 mg/l each of methanol, isopropanol and acetic acid in an ultra pure water (with TOC content of 0.07 mg C/l) already prepared to give the TOC content of 13.77 mg C/l of the water sample with the intention of simulating the TOC content and the composition of main impurities included in TOC content of typical washings discharged from various rinsing steps for the production of integrated circuits. The water sample was found to contain about $3 \times 10^2$ cells/ml of some microorganisms due to atmospheric contamination during the preparation of the sample by such measurement that the water sample prepared as above was filtered through a membrane filter and the cells of such microorganisms captured on said membrane were counted on a light microscope by direct method.

A 600 ml portion of the water sample prepared as above was irradiated with a 9W low-pressure mercury lamp (conventionally used for UV sterilization) in the presence of 1.5 g of the $TiO_2/Pt$ catalyst prepared as in Example 1 for 2 hours.

The water thus treated showed the TOC content of <0.01 mg C/l on TOC analyzer of OIC Model 700 and found no cell of any microorganism by the same count method as above.

The number of living microorganism cells was also counted on both the water samples before and after the above treatment by agar plate dilution method with such result that no living cell was found in the treated sample, whereas $2 \times 10^2$ cells/ml were found in the water sample before the treatment.

By way of comparison, another 600 ml portion of the same water sample as used above was irradiated with the same low-pressure mercury lamp as above for 2 hours without using the photocatalyst above. No decomposition of organic impurities included in TOC content occurred and the TOC content of the water so treated was 13.7 mg C/l. The number of microorganism cells was counted by the same count method as above to be $3 \times 10^2$ cells/ml in both the water samples before and after the treatment. The number of living microorganism cells was also counted by agar plate dilution method and found to be $2 \times 10^2$/ml in the water before treatment and to be zero in the treated water.

The data obtained above clearly demonstrate that the photocatalytic treatment, the characteristic step of this invention, can oxidatively decompose not only a very small amount of organic impurities included in TOC content completely, but also microorganisms contained in water which are quite unexpected from the result of UV sterilization experiment made for comparison purpose. Further, these experiments unexpectedly made clear that the photocatalytic treatment could oxidatively destruct not only living microorganisms but also the dead cells in contrast to the mere UV sterilization as comparative experiment which could only destruct living microorganisms, but not the dead cells which would accumulate little by little during continuous operation for a long period of time, eventually resulting in clogging or obstruction of the filter therewith.

Modifications and variations of this invention are possible in the light of the above teachings. It should therefore be understood that changes may be made in the particular embodiments of the invention described which are within the full intended scope of the invention as defined by the appended claims.

We claim:

1. In a process for the preparation of ultra pure water from a source of water selected from the group consisting of city water, well water, industrial water and washings removed from rinsing steps of semiconductor wafers in integrated circuit manufacturing processes, which process comprises two basic stages (a) and (b), the former stage (a) comprising treating the raw water in one or more mechanical filtration steps to remove solid particulate contaminants suspended therein and the latter stage (b) comprising producing ultra pure water from the pretreated water by subjecting said pretreated water to one or more purification treatments selected from the group consisting of reverse osmosis, adsorption on ion exchange resins, adsorption on activated carbon ultrafiltration, UV sterilization and microfiltration, whereby the removal of residual solid particulate contaminants, of ionic contaminants, of organic contaminants included in total organic carbon (TOC) contents and of microorganisms from the pretreated water to produce ultra pure water is effected, the improvement which comprises incorporating into the stage (b) a catalytic photolysis step for decreasing the TOC content of the water being treated to a level lower than about 0.05 mg C/l, the said step comprising irradiating the water to be so treated in the presence of a catalytic amount of a photocatalyst comprising an inorganic semiconductor in fine particulate form selected from $TiO_2$, $SrTiO_3$ and CdS and a noble metal and/or oxide thereof selected from Pt, Pd, Ru, $RuO_2$ and Rh deposited on said semiconductor particles, said irradiation being with a light of a wave length corresponding to an energy higher than the band gap of said semiconductor and for a period of time sufficient to oxidatively decompose the organic contaminants so as to give said low level of the TOC content in the treated water.

2. A process according to claim 1 wherein the photocatalyst is selected from $TiO_2/Pt$, $TiO_2/Pt+RuO_2$, $TiO_2/Pd$, $TiO_2/Rh$, $SrTiO_3/Pt$ and $CdS/Pt$.

3. A process according to claim 1 wherein the particle diameter of the fine particulate inorganic semiconductor is about 30 m$\mu$ to 100 $\mu$.

4. A process according to claim 3 wherein the particle diameter of the inorganic semiconductor is about 100 m$\mu$ to 10 $\mu$.

5. A process according to claim 1 wherein the amount of noble metal and/or oxide thereof deposited is 0.1 to 15% by weight based on the weight of the semiconductor particles used.

6. A process according to claim 1 wherein the amount of the photocatalyst used is 0.005 g to 5 g per liter of the water to be treated.

7. A process according to claim 1 wherein the TOC content of the water is decreased to a level lower than about 0.01 mg C/l by subjecting the water to the catalytic photolysis step.

* * * * *